(12) United States Patent
Kümper

(10) Patent No.: US 8,777,196 B2
(45) Date of Patent: Jul. 15, 2014

(54) BUSH BEARING WITH A RADIAL AND/OR AN AXIAL LIMIT STOP AND METHOD FOR PRODUCING AN AXIAL LIMIT STOP IN A BUSH BEARING

(75) Inventor: Bernd Kümper, Rahden (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 1152 days.

(21) Appl. No.: 11/363,539

(22) Filed: Feb. 27, 2006

(65) Prior Publication Data

US 2006/0290040 A1    Dec. 28, 2006

(30) Foreign Application Priority Data

Jun. 23, 2005  (DE) .......................... 10 2005 029 614

(51) Int. Cl.
*B60G 11/22*      (2006.01)

(52) U.S. Cl.
USPC ............................................................. 267/293

(58) Field of Classification Search
USPC ......... 267/293, 140.11, 140.13, 140.3, 140.4, 267/140.5, 141.1, 141.3, 141.4, 141.5; 248/635

See application file for complete search history.

(56) References Cited

U.S. PATENT DOCUMENTS

| | | | | |
|---|---|---|---|---|
| 5,190,269 A | * | 3/1993 | Ikeda et al. | 267/140.12 |
| 5,967,668 A | * | 10/1999 | Germano | 384/222 |
| 6,398,200 B1 | * | 6/2002 | Kakimoto et al. | 267/140.12 |
| 2003/0001323 A1 | * | 1/2003 | Hettler | 267/140.12 |
| 2003/0218287 A1 | * | 11/2003 | Mikami et al. | 267/293 |

FOREIGN PATENT DOCUMENTS

| | | |
|---|---|---|
| DE | 2816742 | 10/1979 |
| EP | 528253 A1 * | 2/1993 |
| GB | 2018948 | 10/1979 |

\* cited by examiner

*Primary Examiner* — Xuan Lan Nguyen

(74) *Attorney, Agent, or Firm* — Cohen & Hildebrand, PLLC

(57) ABSTRACT

A bush bearing wherein the spring excursion of the elastomer bearing body is limited in the radial and/or axial direction by at least one limit stop. At least one radially inwardly projecting bead operating as a radial and/or axial limit stop is formed in the outer sleeve in a region of at least one of the axial ends of the bearing ends. The radially inward apex of the bead forms a radial limit stop and/or the axially outer sidewall of the bead forms a bead or shoulder with an outer surface that is covered with the elastomer and represents an axial limit stop.

8 Claims, 9 Drawing Sheets

BUSH BEARING WITH A RADIAL AND/OR AN AXIAL LIMIT STOP AND METHOD FOR PRODUCING AN AXIAL LIMIT STOP IN A BUSH BEARING

BACKGROUND OF THE INVENTION

1. Field of the Invention

The invention relates to a bush bearing, wherein the spring excursion of the elastomer bearing body is limited in the radial and/or axial direction by at least one limit stop. The invention also relates to a method for producing a correspondingly formed axial limit stop in a bush bearing.

2. Description of the Related Art

Elastomer rubber bearings, which are used in large numbers, in particular, in vehicle construction, for example for the wheel suspension, frequently have axial limit stops. The bearing body typically also has radial limit stops, if the elastomer bearing body includes cavities, such as pockets and the like, for achieving a predetermined radial characteristic. The limit stops limit the spring excursion of the elastomer bearing body under axial and/or radial loads. This prevents destruction of the bearing body by excess deformation or excess stress.

Bush bearings of this type include essentially a largely metallic inner part, and elastomer bearing body connected with the inner part by vulcanization, and an outer sleeve receiving both of the aforedescribed components, whereby the outer sleeve can also be connected with the bearing body by vulcanization. The bearing is typically installed at the desired installation site by pressing the outer sleeve of the bearing into a receiving lug.

Radial limit stops are produced, for example, by giving the inner part a particular shape or by applying a contour to the outer surface of the inner part. However, the manufacturing cost of a bush bearing increases significantly if the shape of the inner part deviates from a cylindrical shape or if the inner part has a variable outside diameter. It is also known to provide radial limit stops in bearings with cavities formed in the elastomer bearing body by inserting additional elements made of plastic or metal, whereby the elements are affixed in the cavities, for example with clips. However, these additional bearing components disadvantageously increase of the cost and complexity of assembly of bearings configured in this manner.

Axial limit stops for a bearing body can be formed in a number of ways. Frequently, an axial limit stop is implemented by forming on the end face of the outer sleeve a radially outwardly beaded flange. However, if an axial limit stop is formed by such flange on both sides, then the bearing can no longer be inserted into the intended receiving lug, because the outside diameter of the bearing is greater on both ends than in the remaining regions of the outer sleeve received by the receiving lug. In a conventional practical solution, this problem is avoided in bearings having an axial limit stop on both ends by forming the bearing in two sections split along the axial direction. Each of the two bearing sections is inserted in the bearing lug from a respective side and thereby connected with each other. However, implementing a bearing in two sections disadvantageously increases the costs. Installation of the bearing also becomes more complex which diminishes the productivity and increases cost.

DE 28 16 742 A1 describes a one-part bush bearing, whereby the aforedescribed problem is avoided by forming on one of the axial ends a radially outwardly oriented flange, while forming on the other axial end an inwardly oriented, so-called inside flange. Disadvantageously, however, the bearing reacts differently to positive axial and negative axial forces due to the different design of the two axial limit stops. In addition, the inwardly oriented surfaces of the inner flange restrict the geometric design and contour of the elastomer bearing body. Disadvantageously, this also limits of the calibration factor for adjusting the pretension in the elastomer bearing body. Moreover, the cardanic and torsion characteristic of the bearing cannot be influenced in the desired manner. Bearings designed in this manner therefore have typically a stiff cardanic and torsion characteristic, which increases the load of the bearing body under cardanic and torsion loads and reduces its service life. Pocket contours, which are frequently employed for adjusting the radial damping characteristic of the bearing, can frequently also not be designed to run continuous along the entire axial extent of the bearing. The asymmetric design of the axial bearing ends of the bearing may also cause the inner part to be inclined, which must be corrected by quenching and tempering, thus adding cost.

SUMMARY OF THE INVENTION

It is an object of the invention to form an elastomer bush bearing with at least one radial and/or axial limit stop, so that the aforedescribed disadvantages are eliminated. The bearing should also have a simple design and a low manufacturing cost. Any axial limit stops should preferably be formed so that the bearing can be easily installed in a receiving lug even if the bearing has limit stops on both ends. It is also an object to provide a method for producing corresponding axial limit stops.

The object is solved by a bearing with the features of the independent claim. A method for solving the object is characterized by the features of the first method claim. Advantageous embodiments and modifications of the invention are recited in the corresponding independent claims.

The bush bearing proposed for solving this object, which has at least one radial and/or axial limit stop and is designed for installation in a cylindrical receiving lug, includes an essentially cylindrical metallic inner part, an elastomer bearing body surrounding the inner part and connected thereto preferably by vulcanization, as well as an outer sleeve receiving the inner part together with the bearing body. The outer sleeve can also be connected with the bearing body by vulcanization, whereby the aforementioned components, i.e., on one hand, the inner part and the bearing body and, on the other hand, the bearing body and the inner part, can be connected in a single vulcanization operation. According to the invention, at least one radially inwardly projecting bead, which operates as a radial and/or axial limit stop, is formed in the outer sleeve in the region of at least one of the axial bearing ends. The radially inward apex of the bead forms a radial limit stop and/or the axially outer sidewall forms a bead or shoulder, with the outer surface of the bead or shoulder being covered with an elastomer and representing an axial limit stop. The axial limit stop is implemented by formed the bead(s) preferably continuously along the periphery of the outer sleeve of the bearing.

In a preferred practical embodiment of the bearing according to the invention, an axial limit stop is formed on at least one axial end of the bush bearing by arranging a circumferential V-shaped bead in the outer sleeve of the bush bearing, wherein the axially outer sidewall of the bead is formed by a radially outwardly protruding flange. Because the flange is formed continuously, an axial flange is realized, with the axially outer surface of the flange being covered by the elastomer of the bearing body. The bead is pulled so deep into the material of the outer sleeve that the outside diameter of the axial flange is smaller than the smallest inside diameter of a receiving lug adapted to receive the bearing. Accordingly, the outside diameter of this flange is smaller than the outside diameter of those regions of the outer sleeve that may contact the inside surfaces of the receiving lug when the bearing is installed. As mentioned above, in this embodiment the outer surface of the flange is covered with the same material which also makes up the elastomer bearing body. The elastomer is applied on the flange and the elastomer is connected with the outer surface of the flange in the same operation as the vulcanization of the other bearing components. In this embodiment, the outer sleeve is therefore connected with the bearing body by vulcanization. The radially outwardly projecting flange is oriented at an approximately right angle with respect to the bearing axis.

If the bearing body in the last described embodiment has a cavity in the region of the bead, then the bead simultaneously forms an axial limit stop as well as a radial limit stop. The apex of the bead represents a radial limit stop for the unobstructed radial excursion in the cavity for the elastomer, whereas the axial limit stop is implemented by the flange formed by the axially outer sidewall, which is covered with the elastomer.

In a possible modification of the two aforedescribed embodiments of a bush bearing with a limit stop on both sides formed according to the invention, the axial flange is can have different outside diameters. While the outside diameter of one axial flange is dimensioned so that it can be inserted through a receiving lug adapted to receive the bearing, the outside diameter of the other axial flange is greater than the maximum inside diameter of the corresponding receiving lug. The axial flange with the enlarged outside diameter then functions also as an installation limit stop when the bearing is installed. Disadvantageously, an inner part with different outside diameters is more difficult to manufacture. However, if the bearing of the invention designed in this manner has cavities or pockets in the region of the limit stops formed by the beads, the unobstructed excursion defined by the cavities in the elastomer can be affected in other ways. In another embodiment of the bearing of the invention, the outside diameter of the inner part can be varied in the axial direction. The bush bearing of the invention can also be implemented as a hydraulic bearing by including chambers for a fluid damping means, and an overflow channel or throttle channel connecting the chambers. In addition, inserts made of plastic or metal can be arranged in the elastomer bearing body for adjusting the radial characteristic.

According to the invention, the following method is proposed for implementing an axial limit stop in a bush bearing. The bearing components, i.e., the inner part, the elastomer bearing body and the outer sleeve, are initially assembled in a conventional manner. The cylindrical metallic inner part and the elastomer forming the bearing body are joined by a vulcanization process. Preferably, the outer sleeve, whose axial edge was previously flanged to produce the axial limit stop, is connected in the same vulcanization operation with the inner part or, alternatively, the inner part is installed in the outer sleeve with the bearing body after the vulcanization. In the latter case, the outside flange on the outer sleeve must be provided with an elastomer in a separate vulcanization operation. The bearing components are therefore preferably joined with each other in a common vulcanization process, wherein the outer surface of the axial flange formed by flange is also covered with an elastomer. The axial flange preferably protrudes outwardly at an approximately right angle relative to the bearing axis. After the bearing components are assembled, a bead is pressed into the outer sleeve with a forging die at a location where the axially outer wall of the bead matches the flange of the outer sleeve. Similarly, in a bush bearing with an axial limit stop on both sides, both axial ends of the outer sleeve are flanged and a bead is pressed at the aforedescribed location in the region of both axial flanges.

If cavities or pockets are formed in the bearing body in the region where the beads are to be formed, molded parts are inserted in these cavities preferably for the duration of the die forging, which function as a bottom die to limit the depth of the bead to be applied with the die.

BRIEF DESCRIPTION OF THE DRAWINGS

Certain exemplary embodiments of the invention will now be described with reference to the corresponding drawings.

DETAILED DESCRIPTION OF THE INVENTION

Figure 1A:
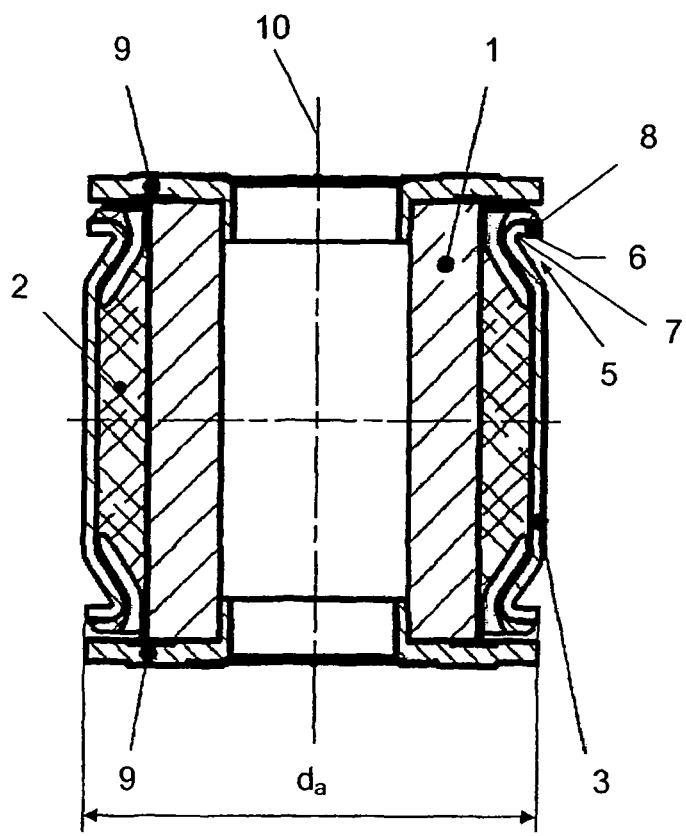
FIG. 1a shows schematically an exemplary embodiment of a bearing according to the invention in an axial cross-section.

FIG. 1a shows schematically in cross-section an exemplary embodiment of the bearing of the invention, with the cross-section taken along the axial direction of the bearing. The bearing consists essentially of a metallic cylindrical inner part 1, the elastomer bearing body 2 connected with the inner part 1 by vulcanization, and the likewise metallic outer sleeve 3 which receives the inner part 1 together with the bearing body 2. Both sides of the bearing have an axial limit stop. For this purpose, the outer sleeve 3 is formed as a so-called double-flange section. According to the basic concept of the invention, the axial limit stops are each formed by a bead 5 formed in the outer sleeve 3 in the region of an axial bearing end. The respective axially outer sidewall 6 of the two beads 5 forming the axial limit stops is formed by the axial inner surface of a flange 8 which protrudes outwardly in the radial direction on the bearing ends. The outside of the axial flange formed by the flange 8 is covered by the elastomer of the bearing body 2 and forms the axial limit stop. As indicated, the illustrated bearing has cavities 11 formed in the region of the axial ends of the elastomer bearing body 2. These pockets 11 are provided to realize particular radial characteristics. The beads 5 form simultaneously axial and radial limit stops for the bearing designed in this manner. The axial limit stops are herein formed by the radially outer sidewalls 6 of the beads 5 which function as the axial flange 8, whereas the radial limit stops are realized by the apexes 7 of the beads 5 projecting into the cavities 11. The beads 5 operating as a radial limit stop limit the unobstructed excursion for the elastomer defined by the cavities 11.

For installation at the predetermined location, so-called spacers 9 or spacer disks are pressed into the bearing from both sides in the axial direction. The spacers define a contact surface at the installation site. The bearing is installed by inserting the bearing with the axial flanges 8 and the spacers 9 into the bearing lug 4. This is feasible because the depths of the beads 5 is dimensioned so that the outside diameter da of the axial flanges 8 does not exceed the outside diameter of the regions of the bearing sleeve that contact the inner surfaces of the lug or, more precisely, does not exceed the minimum inside diameter di of the receiving lug 4 (see FIG. 1c). A one-piece bush bearing with the axial limit stop on both ends is hereby realized, where both axial limit stops are formed in the same manner as outer bearing flanges 8. This bearing can nevertheless be easily installed in a receiving lug 4, without requiring the bearing to be split in the axial direction.

Figure 1B:
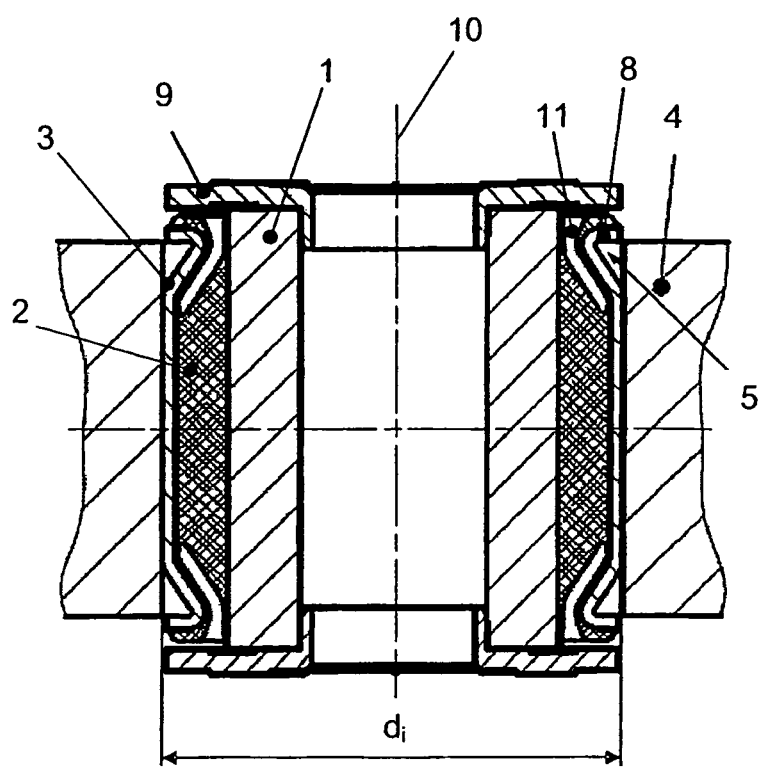
FIG. 1b shows the bearing of FIG. 1a after installation in a receiving lug.
Figure 1C:
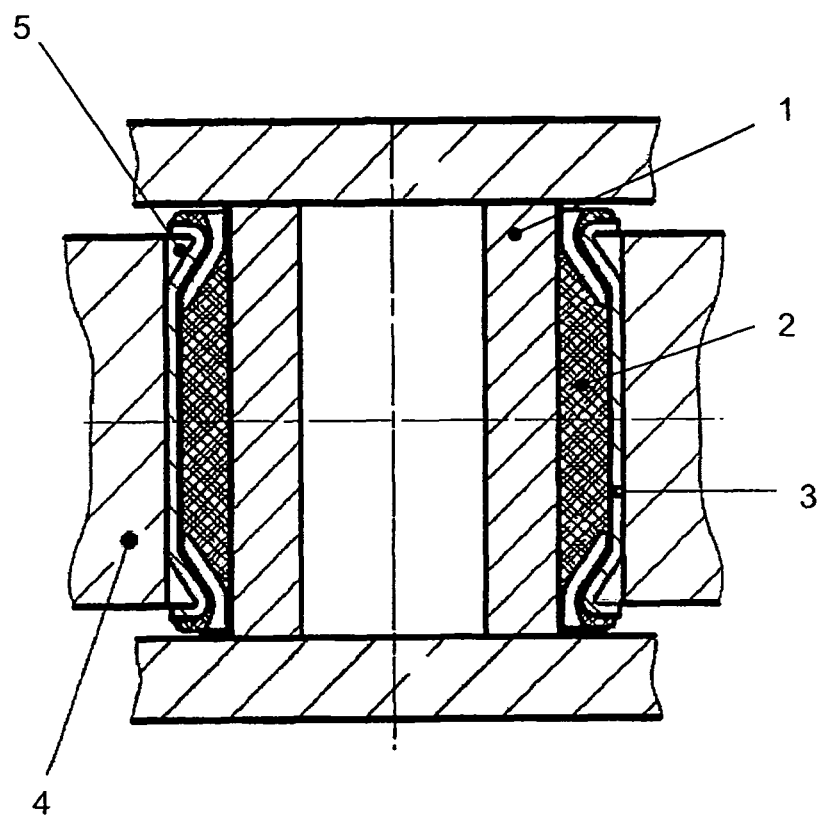
FIG. 1c shows the bearing of FIG. 1a installed in the receiving lug without a spacer.

FIG. 1b shows the corresponding installation. The bearing is hereby simply pressed into the respective receiving lug 4 until the end position depicted in FIG. 1b is reached. The bearing can be attached to a support surface by a screw connection via a through bore disposed in the inner part 1. The spacer 9 provided in FIGS. 1a and 1b can be omitted if the support surface at the intended installation site is large enough. The installation for this embodiment is shown in FIG. 1c. The inner part 1 of the bush bearing without the spacer 9 makes direct contact with a support surface 13 at the installation site.

Figure 2:
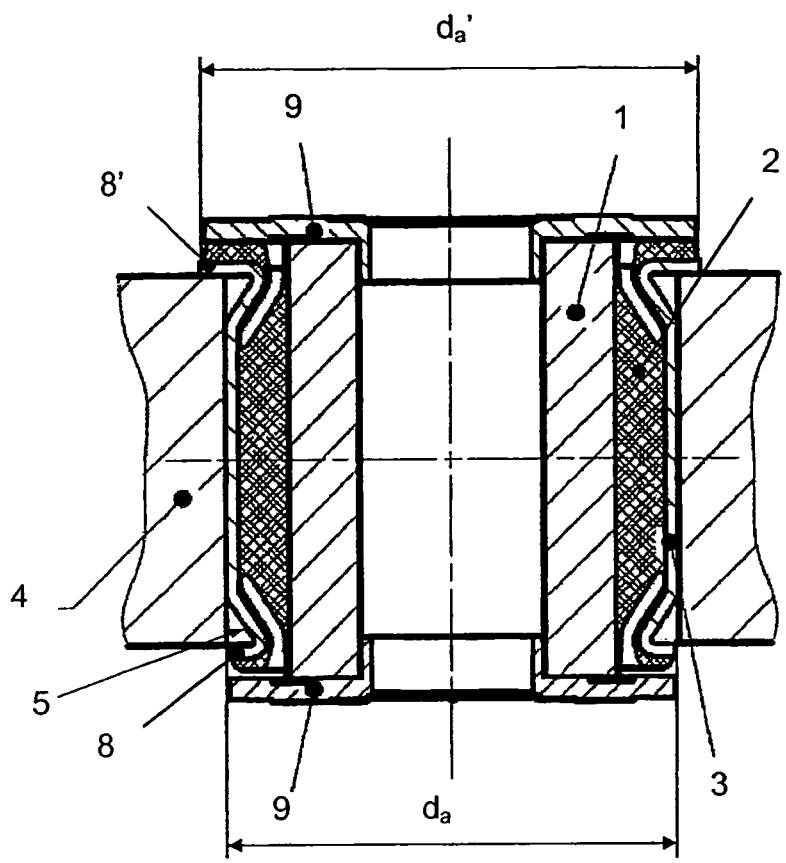
FIG. 2 shows a modified embodiment of the bearing of the invention.

FIG. 2 shows a modified embodiment of a bush bearing of the invention compared to the embodiment of FIGS. 1a to 1c. The axial flanges 8, 8' are here dimensioned so that the bearing can only be inserted into the receiving lug 4 from one side. The outside diameter da of only one axial flange 8 is herein smaller than the inside diameter di of the receiving lug 4. Conversely, the other outer axial flange 8' is intentionally formed with a larger diameter da' and consequently forms an installation limit stop when the bearing is installed in the receiving lug 4. However, the larger axial flange 8' or the corresponding axial limit stop is also configured according to the invention to be large enough so that the axial inner surface is formed by the sidewall of a bead 5.

Figure 3A:
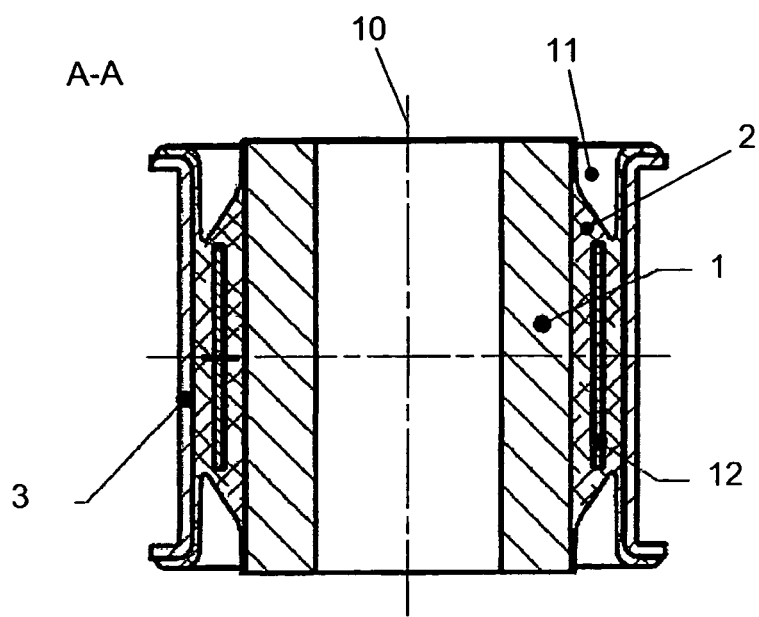
FIG. 3a shows an embodiment of the bearing in a longitudinal cross-section before formation of the beads.

FIG. 3a shows another exemplary embodiment of the bush bearing before the beads 5 are applied. The outer sleeve has here also a double flange. However, unlike the embodiments depicted in FIGS. 1a to 1c, inserts 12 made of metal or plastic are inserted in the elastomer bearing body 2 to obtain regions with a stiffer radial characteristic.

Figure 3B:
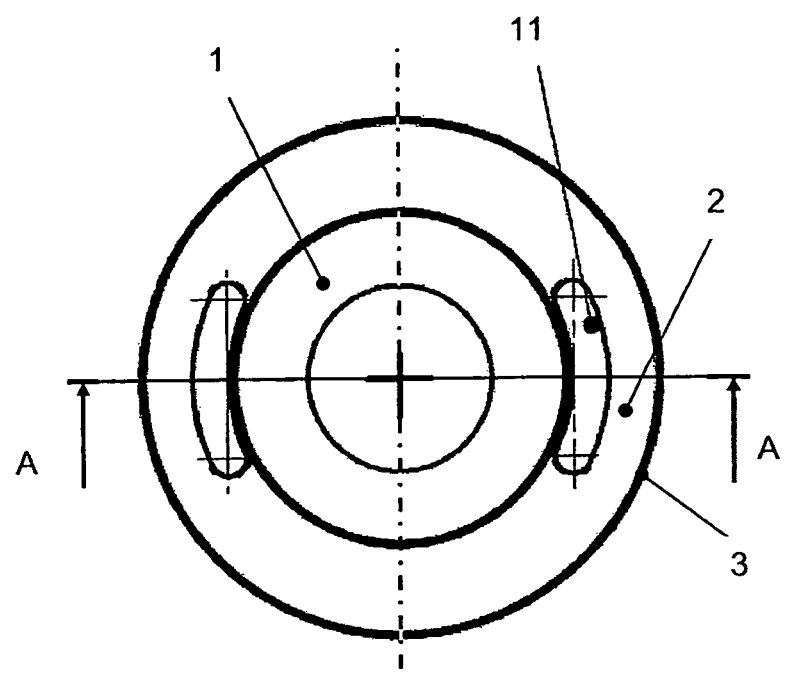
FIG. 3b shows a top view of the bearing of FIG. 3a onto the axial limit stop.
Figure 4:
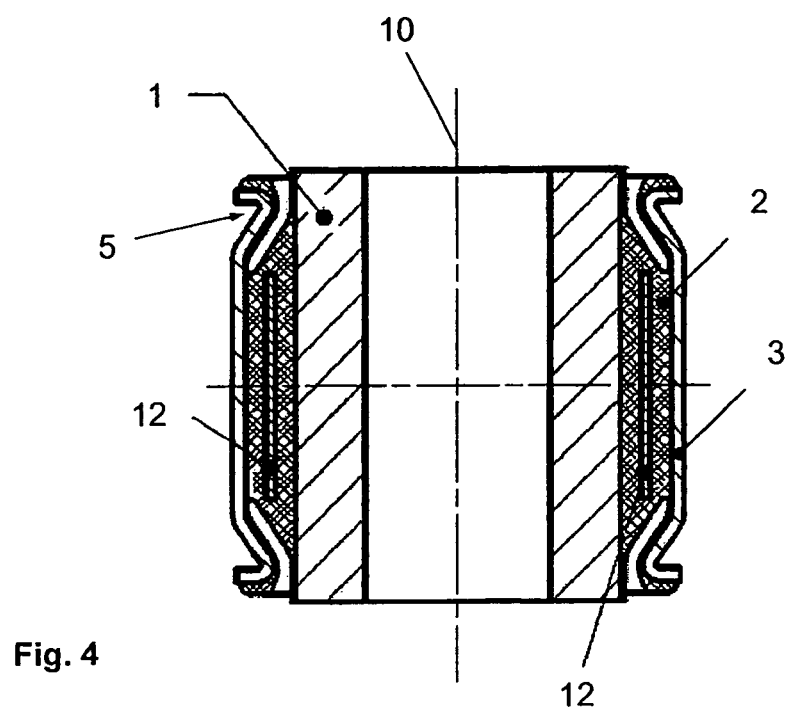
FIG. 4 shows the bearing of FIG. 3a after formation of the beads.

FIG. 3b shows again a top view of the bearing onto one of its axial ends, whereas FIG. 4 shows the bearing of FIG. 3a after formation of the beads 5.

Figure 5:
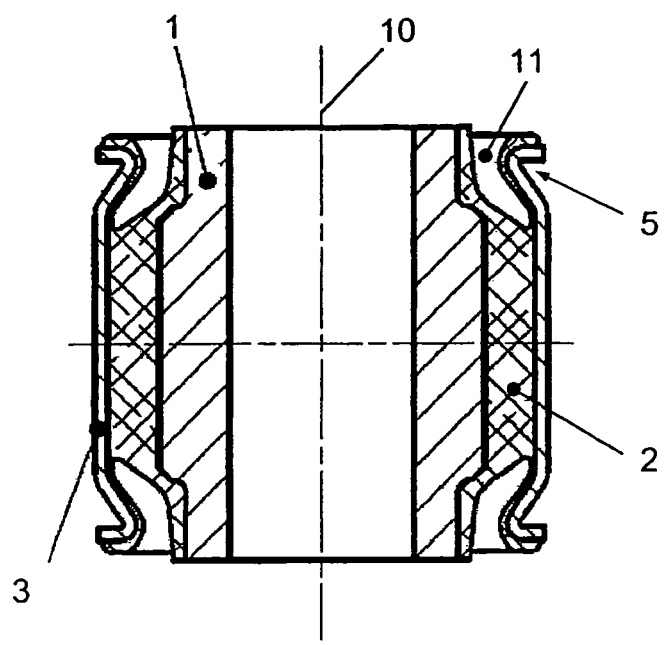
FIG. 5 shows another embodiment of the bearing of the invention.

FIG. 5 shows another exemplary embodiment of the bearing of the invention. In this embodiment, the axial ends of the cylindrical inner part 1 have a smaller outside diameter than to the central region. Applying the same inventive concept, limit stops for this bearing are formed in the region of the axial bearing ends by beads 5, which simultaneously operate as axial and radial limit stops. The radial limit stop can be variably adjusted by suitably shaping the inner part and dimensioning the depth of the formed beads 5 in the so-called calibration process, i.e., when generating a defined pretension in the elastomer bearing body.

Figure 6:
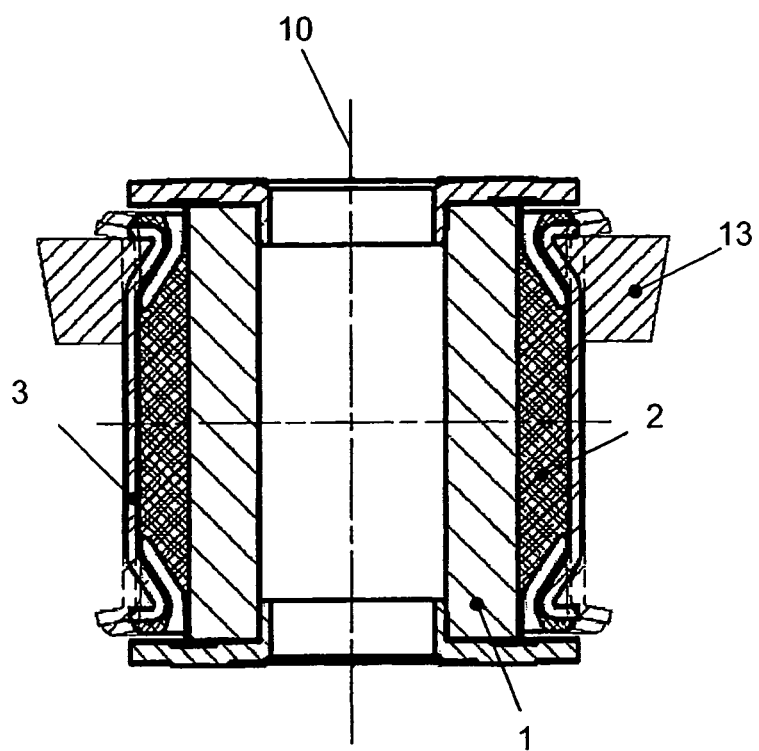
FIG. 6 shows the process of forming the beads with a forging die.

FIG. 6 illustrates the calibration process and the process of forming the beads 5 with a forging die 13, respectively. The beads 5 of a bearing, which is initially formed according to FIG. 3a (without inserts), are formed by the V-shaped tip of a forging die 13. This operation produces, on one hand, a pretension in the elastomer bearing body 2 and, on the other hand, moves the outer edge of the flange 8 radially inwardly, thereby reducing the outside diameter da of the respective axial flange 8. Stated differently, the outside diameter of the axial flange and the pretension of the bearing body are defined in a common calibration operation. By suitably dimensioning the depth of the beads 5, the outside diameter da of both axial flanges 8, or the outside diameter da of at least one axial flange 8, is preferably reduced to a diameter which is smaller than the diameter of the other regions of the outer sleeve and/or smaller than the minimum inside diameter di of the a bearing lug 4 adapted to receive the bearing. Accordingly, the bearing can be easily inserted in the receiving lug 4.

What is claimed is:

1. A bush bearing configured for installation in a cylindrical receiving lug and comprising:
    a cylindrical metallic inner part having a uniform outer diameter in an axial direction,
    an elastomer bearing body surrounding the inner part and connected thereto by vulcanization,
    an outer sleeve receiving the inner part together with the bearing body, and
    at least one radially inwardly protruding bead formed in the reoion of at least one axial bearing end of the outer sleeve,
    wherein a radially inward apex of the at least one bead forms a radial limit stop and an outer sidewall of the bead is formed as a radially outwardly protruding flange, and wherein an outer surface of the flange is covered with an elastomer and forms art axial limit stop,
    wherein the bead is formed continuous along the periphery of the outer sleeve so as to form the axial limit stop,
    wherein the at least one bead is pulled so deep into the material of the outer sleeve that an outside diameter of the flange covered by the elastomer is less than a minimum inside diameter of a receiving lug receiving the bearing, wherein the bush bearing, is made as a continuous piece in the axial direction.

2. The bush hearing according to claim 1, wherein the flange projects radially outwardly at an approximately right angle in relation to the axial direction.

3. The bush bearing according to claim 1, wherein the elastomer bearing body includes only two cavities disposed at each axial end between the outer sleeve and inner part, each cavity disposed in a region of the bead.

4. The bush bearing according to claim 3, wherein the apex of the bead limits unobstructed radial travel in the cavity of the elastomer.

5. The bush hearing according to claim 1, wherein inserts made of plastic or metal are inserted in the elastomer beating body for affecting radial characteristic.

6. The bush bearing according to claim 1, wherein at least the inner pan is made as a single piece.

7. The bush bearing according to claim 1, wherein the outer sleeve is made as a single piece.

8. The bush bearing according to claim 1, wherein the at least one radially inwardly protruding bead is formed in the region of each axial bearing end of the outer sleeve, the outer sleeve covering the entire outer surface of the elastomer bearing body between the beads.

* * * * *